Patented Aug. 5, 1952

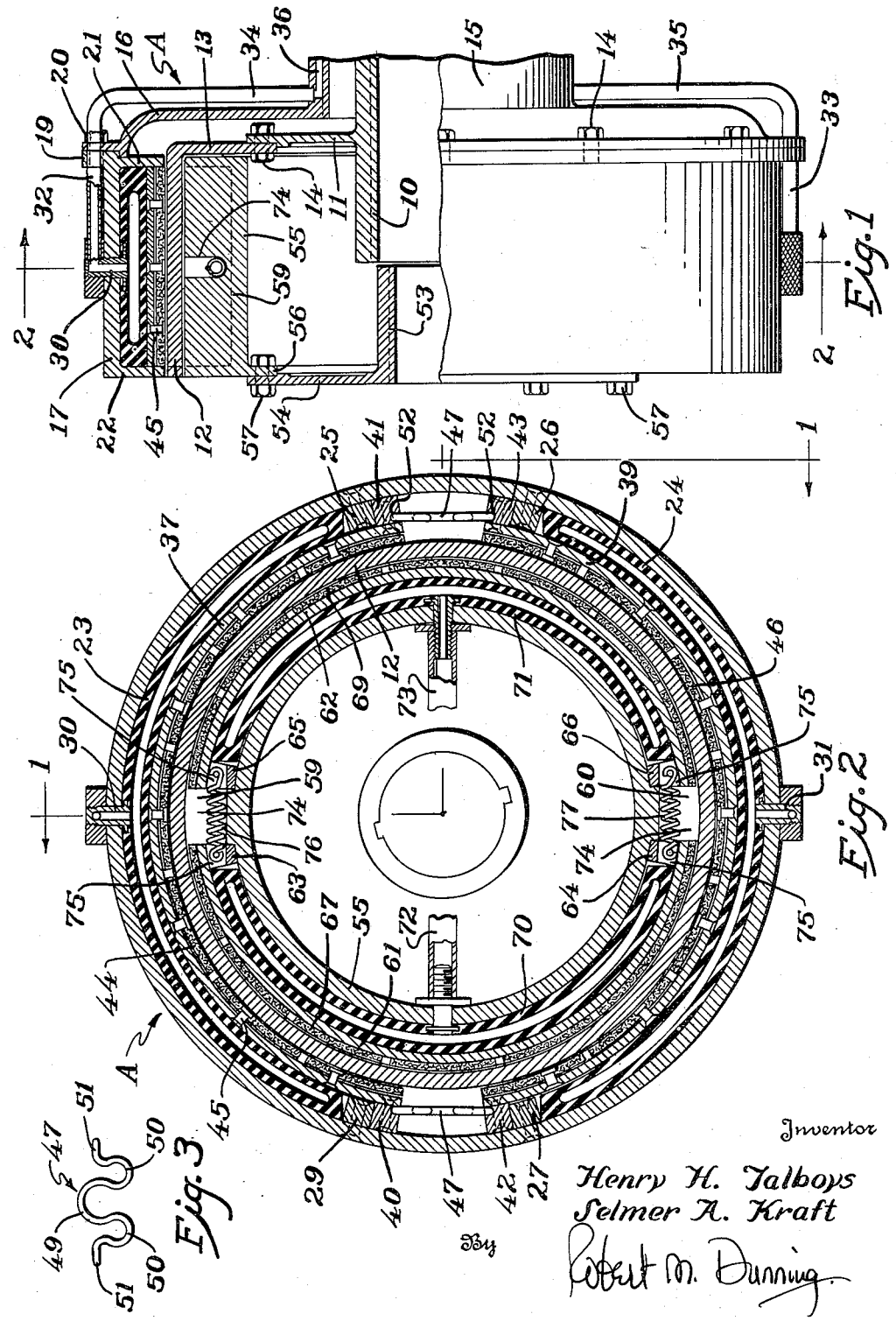

2,605,863

UNITED STATES PATENT OFFICE 2,605,863

BRAKE AND CLUTCH

Henry H. Talboys, Milwaukee, Wis., and Selmer A. Kraft, St. Paul, Minn., assignors to Johnson Power-On Transmission Corporation, Chicago, Ill., a corporation of Illinois Application January 3, 1949, Serial No. 69,014

6 Claims. (Cl. 188—152)

Our invention relates to an improvement in brake and clutch wherein it is desired to provide a means of holding one member from rotating relative to another.

Brakes and clutches often have certain similarities of principle. In either device one rotatable member is designed to be held from rotation relative to another. In a brake, the rotatable member must be held from rotation relative to a non-rotatable member. In a clutch it is usually desirable that two relatively rotatable elements be held from relative rotation. The present device may be used to comprise either a clutch or a brake.

Certain brakes and clutches have been made embodying expandable and contractable tubes. In most instances these tubes form a driving connection between a rotatable member and a brake or clutch shoe. The present invention deals with a type of brake and clutch in which the brake and clutch shoes are fixed relative to one of the elements and is merely moved radially by the expandable member.

An object of the present invention lies in the provision of a brake and clutch which will operate effectively in either direction. The brake and clutch shoes of our device are provided with interlocking means which limit the rotative movement of the shoe relative to the supporting member. As a result one end of the shoe is held fixed from rotation upon contact with a relatively rotatable element, while the other end of the shoe is free to press against the relatively rotatable element. In the other direction of rotation the opposite end of the brake shoe becomes dead ended to its supporting member and the first end of the brake shoe is free to engage the relatively rotatable element. As a result an efficient braking system is provided with a maximum of simplicity.

A feature of the present invention lies in the provision of a brake and clutch including a brake shoe, a brake shoe support, a relatively rotatable member, and an expandable and contractable member for urging the brake shoe against the relatively rotatable element. The ends of the brake shoe interlock with the supporting element to permit only slight rotative movement therebetween. When the expandable element urges the brake shoe against the rotatable element, the rotation thereof tends to draw the brake shoe against the rotatable element to prevent relative movement therebetween.

These and other objects and novel features of our invention will be more clearly and fully set forth in the following specification and claims.

In the drawings forming a part of our specification:

Figure 1 is an elevational view partly in section showing our brake and clutch construction.

Figure 2 is a sectional view on the line 2—2 of Figure 1.

Figure 3 is a detail view of a type of spring which may be used with the brake and clutch.

For the purpose of convenience the brake and clutch will be described as a clutch in the following description. Obviously by holding one of the rotatable elements from rotation the device can comprise a brake.

The clutch A includes a hub 10 having a radially extending circular flange 11 secured thereto. A substantially cylindrical drum 12 is provided with a ring shaped flange 13 thereupon which may be bolted or otherwise secured to the flange 11 by means of bolts 14. The hub 10 may be keyed to a rotatable shaft or sleeve or may be held from rotation depending upon the use to which the clutch is being put.

A second hub 15 supports a peripheral flange 16. A cylindrical outer shell 17 is provided with a peripheral flange 19 bolted or otherwise affixed to the flange 16 by bolts 20. The shell 17 is provided with two parallel inwardly extending flanges 21 and 22. These flanges encircle the drum 12 and lie in closely spaced relation thereto.

A pair of hollow arcuate expandable and contractable tubes 23 and 24 are supported in opposed relation against the inner surface of the shell 17 between the flanges 21 and 22. These tubes 23 and 24 are held in place by four angularly spaced lugs or abutments 25, 26, 27, and 29. These abutments are secured to the outer shell 17 or are integral therewith and define the length of space in which the tubes 23 and 24 are located.

Radially extending tubular connections 30 and 31 communicate with the interior of the tubes 23 and 24 respectively. These tubular connections 30 and 31 communicate with axially extending tubular members 32 and 33 which are bent to form radially extending tubes 34 and 35 extending into a groove 36 in the hub 15. By forcing fluid into the groove 36, this fluid may be communicated into the tubular members 23 and 24 to expand the same. The relation of fluid pressure permits a reverse flow of fluid and consequent contraction of the tubular elements.

A pair of brake shoes 37 and 39 are mounted inwardly of the expandable and contractable members 23 and 24. The brake shoe 37 is provided with a pair of radially extending lugs or abutments 40 and 41 at its opposite ends. The brake shoe 39 is similarly provided with a pair of radially extending abutments 42 and 43 at its opposite ends. These abutments are designed to engage the abutments 25, 26, 27 and 29 on the outer shell 17.

A brake lining 44 is secured by rivets 45 or other suitable means to the brake shoe 37. A similar brake lining 46 is riveted or otherwise secured to the brake shoe 39. Thus when the brake shoe is urged inwardly by expansion of the tubular elements 23 and 24, the brake linings 44 and 46 engage frictionally against the exterior surface of the drum 12.

The operation of the clutch thus formed is relatively simple. When it is desired to prevent relative rotation between the hub 36 and the hub 10, fluid pressure is introduced into the tubular elements 23 and 24, tending to expand the same. Expansion of these tubular elements moves the brake shoes 37 and 39 inwardly and urges the brake linings 44 and 46 against the drum 12. If the drum 12 is moving in a clockwise direction as viewed in Figure 2, relative to the shell 17, the frictional engagement between the lining of the brake shoe 37 and the drum 12 draws the lug 40 against the abutment 29 and acts to wrap the end of the shoe supporting the lug 41 against the drum 12. Simultaneously, the engagement of the lining of the brake shoe 39 against the drum 12 draws the lug 43 against the abutment 26 and wraps the end of the shoe supporting the lug 42 about the drum 12. Obviously the lugs 41 and 42 tend to pull away from their respective fixed abutments 25 and 27.

Upon operation of the clutch when the drum 12 is rotated in a counter-clockwise direction relative to the shell 17, the lug 41 of the brake shoe 37 will be drawn tightly against the abutment 25, while the end of the shoe supporting the lug 40 will wrap about the drum 12. Similarly the lug 42 and brake shoe 39 will be drawn against the abutment 26 and the end of the shoe supporting the lug 43 will wrap about the drum 12, tending to pull away from the fixed abutment 27. This wrapping action of the brake shoes about the drum 12 produces an effective braking action between the shell 17 and the drum 12.

A spring 47 is inserted between the lugs 41 and 43 of the brake shoes 37 and 39 respectively, and a similar spring 47 is interposed between the lugs 40 and 42 of these same brake shoes. The springs 47 are expansion type springs shaped to urge the connected lugs apart or against the fixed abutments. This thus expands the brake shoes and holds them out of contact with the brake drum 12.

The springs may be constructed as best illustrated in Figure 3 of the drawings. In this figure the springs 47 are shown as having a central loop 49 having transversely extending ends which are bent to form spaced loops 50. The loops 50 terminate in outwardly directly opposed ends 51 which engage in suitable sockets or apertures such as 52 in the various lugs. The springs are preferably slightly in compression when in place and movement of the lugs in a direction to contract the brake shoes acts to further compress the springs 47.

A second clutch or brake member is also incorporated in the clutch and brake A. A hub 53 is provided for engagement on a suitable shaft or sleeve. A disc shaped flange 54 extends outwardly from the hub 53. A generally cylindrical ring 55 is supported concentric to and spaced inwardly from the drum 12. This ring or sleeve 55 is provided with an inwardly extending integral flange 56 which overlaps with and is bolted to the flange 54 by bolts 57 or other suitable means. The sleeve 55 is provided with a pair of diametrically opposed outwardly projecting fixed abutments 59 and 60. These abutments extend radially to a point slightly spaced from the inner surface of the drum 12. A pair of arcuated brake shoes 61 and 62 are provided outwardly of the sleeve 55. The brake shoe 61 is provided with a pair of inwardly extending lugs 63 and 64 at its opposite ends which are engageable against the fixed abutments 59 and 60. The brake shoe 62 is similarly equipped with a pair of lugs 65 and 66 which are mounted on the ends of the shoe and which are designed to engage against the fixed abutments 59 and 60. Brake lining material provides friction surfaces 67 and 69 on the brake shoes 61 and 62, the brake lining material being riveted or otherwise secured to the brake shoes.

An arcuated hollow expandable and contractable tubular element is provided inwardly of each brake shoe, the brake shoe 61 being provided with a tubular member 70, while the brake shoe 62 is provided with an expandable tubular element 71. Hollow stems 72 and 73 communicate with the interior of the tubular members 70 and 71 so as to deliver fluid under pressure thereto. When fluid under pressure is exerted through the stems 72 and 73 the brake shoes are expanded against the brake drum 12 tending to prevent relative rotation between these members.

As indicated in Figure 2 of the drawings the abutments 59 and 60 are provided with notches 74 therein and the various lugs are also centrally recessed as indicated at 75. A spring 76 is pin connected to the lug 63 and to the lug 65 tending to draw these lugs toward each other. A similar spring 77 connects the lugs 64 and 66, tending to pull these lugs together. The springs 76 and 77 lie in the notches 74 and tend to hold the brake shoes contracted against the sleeve 55. Thus when pressure is released in the tubular members 70 and 71, the brake shoes are contracted and disengaged from the inner drum surface.

It will be seen that upon expansion of the tubes 70 and 71 the brake shoes 61 and 62 are urged against the drum 12 and the frictional contact therebetween tends to rotate the brake shoes. If the drum 12 is rotating in a clockwise direction as viewed in Figure 2, the lugs 63 and 66 will be urged against the abutments 59 and 60 and the other ends of these shoes will be free to wrap against the inner surface of the drum. Thus the front end of the brake shoe is in each case dead ended, while the rear end is free to press against the drum. A similar arrangement is provided when the drum 12 is operating in a counter-clockwise direction. The lug ends 65 and 64 press against the abutments 59 and 60 respectively and form a dead end for the forward ends of the brake shoes, allowing the rear end to freely urge against the drum.

In accordance with the patent statutes, we have described the principles of construction and operation of our brake and clutch, and while we have endeavored to set forth the best embodiment thereof, we desire to have it understood that obvious changes may be made within the scope of the following claims without departing from the spirit of our invention.

We claim:

1. A friction device including a pair of concentric drums, means supporting said drums for relative rotation, a pair of fixed abutments on the outermost drum extending inwardly therefrom, a brake shoe between said drums and extending between said fixed abutments and the inner drum, means on the ends of said brake shoe engageable with said fixed abutments outwardly of said fixed abutments, and expandable and contractable means between said brake shoe and the outermost drum.

2. A friction device including a pair of spaced concentric drums, a pair of opposed brake shoes between said drums and engageable with the inner of said drums, a pair of abutments for each brake shoe on the outer drum, said brake shoes extending beyond said abutments, lugs on the ends of said brake shoes beyond said abutments engageable with said fixed abutments and expandable and contractable members between each brake shoe and the outer drum.

3. The structure described in claim 2 and including spring means for urging said lugs against said abutments.

4. The structure described in claim 2 and including spring means for urging the ends of said brake shoes apart.

5. The structure described in claim 2 in which the expandable and contractable elements comprise hollow tubular elements between said fixed abutments.

6. A friction device including a pair of concentric relatively rotatable elements, an inner generally cylindrical surface on the outer element, a pair of fixed lugs extending inwardly from the cylindrical surface of the outermost of said rotatable elements, a brake shoe between said rotatable elements and extending beyond and inwardly of said lugs, outwardly extending lugs on the ends of said brake shoe extending beyond said fixed lugs engageable against said fixed lugs and forming the driving connection therebetween, and an expandable and contractable element between said brake shoe and the outer of said rotatable elements.

HENRY H. TALBOYS.
SELMER A. KRAFT.

REFERENCES CITED

The following references are of record in the file of this patent:

UNITED STATES PATENTS

| Number | Name | Date |
|---|---|---|
| 1,047,713 | Smith | Dec. 17, 1912 |
| 1,707,272 | Livingston | Apr. 2, 1929 |
| 1,954,158 | Ward | Apr. 10, 1934 |
| 2,249,405 | Thompson | July 15, 1941 |
| 2,257,771 | Williamson | Oct. 7, 1941 |

FOREIGN PATENTS

| Number | Country | Date |
|---|---|---|
| 593,078 | Great Britain | Oct. 8, 1947 |